(12) United States Patent
Sutton, Sr.

(10) Patent No.: US 6,810,767 B1
(45) Date of Patent: Nov. 2, 2004

(54) FLOATING ROLLER LOCK

(75) Inventor: Warren Dale Sutton, Sr., Wathena, KS (US)

(73) Assignee: Aerospace Systems & Components, Inc., Wichita, KS (US)

( * ) Notice: Subject to any disclaimer, the term of this patent is extended or adjusted under 35 U.S.C. 154(b) by 52 days.

(21) Appl. No.: 10/200,981

(22) Filed: Jul. 22, 2002

(51) Int. Cl.[7] .............................. G05G 1/04; G05G 5/06; B21J 9/18
(52) U.S. Cl. .............................. 74/526; 74/527; 74/529; 74/89.11; 72/451
(58) Field of Search ........................ 74/526, 527, 528, 74/529, 89.11; 73/81; 140/93.2; 72/451, 436; 83/150

(56) References Cited

U.S. PATENT DOCUMENTS

| | | | | | |
|---|---|---|---|---|---|
| 3,881,380 A | * | 5/1975 | Paramonoff | ................. | 83/150 |
| 3,926,033 A | * | 12/1975 | Forichon | ................. | 72/451 |
| 4,159,634 A | * | 7/1979 | Stengard | ................. | 72/436 |
| 4,895,213 A | * | 1/1990 | Neyret | ................. | 173/212 |
| 5,511,589 A | * | 4/1996 | Scruggs | ................. | 140/93.2 |
| 6,357,282 B1 | * | 3/2002 | Benjamin | ................. | 73/81 |

FOREIGN PATENT DOCUMENTS

| | | | | |
|---|---|---|---|---|
| DE | 2517039 | * | 10/1976 | ................. 74/527 |

\* cited by examiner

Primary Examiner—Vinh T. Luong
(74) Attorney, Agent, or Firm—Kenneth H. Jack

(57) ABSTRACT

A lock comprising a roller stop having a forward end; at least a first roller receiving concavity mounted for movement across the forward end of the roller stop; a roller mounted for movement between forward and rearward positions, the roller, while at its forward position, extending into the at least first roller receiving concavity and overlying the forward end of the roller stop; a plunger having a forward end and a rearward end, the plunger being mounted for motion between forward and rearward positions, the plunger, while at its forward position, holding the roller at its forward position, the plunger, while at its rearward position, allowing the roller to move to its rearward position; and a toggle mounted for alternate flexion and hyperextension, the toggle, upon hyperextension, holding the plunger at its forward position, the toggle, upon flexion, holding the plunger at its rearward position.

13 Claims, 8 Drawing Sheets

FLOATING ROLLER LOCK

FIELD OF THE INVENTION

This invention relates to locking mechanisms. More particularly, this invention relates to locking mechanisms which incorporate a floating roller locking member.

BACKGROUND OF THE INVENTION

Locks which include a locking member/locked member assembly commonly alternately and selectively restrain and release a load force applied to the assembly. Such assemblies are known to utilize the restrained load as a motive force in the mechanical operation of the locking mechanism itself. For example, where an intruder presses upon a security door which is latched by a dead bolt, the dead bolt desirably remains extended in its locked position. Pressure applied by the intruder tends to frictionally press the bolt against the door jamb, desirably preventing the bolt from being withdrawn while load forces are applied. Alternately, locked member/locking member assemblies may be configured to harness a load force restrained by the lock for moving the locking member from a locked position to an unlocked position. A rotatable bow string nut of a crossbow is an ancient example of such locked member/locking member assembly.

A drawback or deficiency common to locked member/locking member assemblies which are adapted for utilizing a restrained load force in the mechanical operation of the lock, is that such assemblies are commonly incapable of utilizing such force for both locking and unlocking the lock mechanism.

The instant inventive lock solves or ameliorates the deficiencies noted above by providing structure which allows load forces applied to a member locked by a roller to alternately and selectively hold the roller in its locked position, and drive the roller to its unlocked position.

BRIEF SUMMARY OF THE INVENTION

The locked member of instant inventive lock comprises, for example, a rotatably mounted wheel or a fixedly mounted circular stator. The exemplary wheel or stator has at least a first concavity or indentation extending inwardly from one of its annular surfaces. Preferably, the surface into which the at least first concavity extends is an annular outer surface. Suitably, an annular side wall surface or inner surface of the exemplary wheel or stator may include the at least first concavity. Preferably, the annular surface into which extends the at least first concavity further includes either a plurality or a multiplicity of nearly identical concavities arranged radially around such annular surface. Suitably, the locked member may comprise a straight bar, a curved bar, flat plate, a curved plate, or a chain. Regardless of the geometric character of the locked member, a surface of the locked member necessarily includes such at least a first concavity, and preferably a plurality or multiplicity of nearly identical linearly oriented concavities.

The at least first concavity is preferably fitted for nesting receipt of a locking member, the locking member preferably comprising a roller configured as a spherical body or as a cylindrical body. Where the roller comprises a spherical body, a common ball bearing may be utilized. Where the roller comprises a cylindrical body, a common roller bearing may be utilized. Preferably, the depth of the at least first concavity is less than one-half of the diameter of the roller which it is to nestingly receive. Restricting the depth of the at least first concavity to less than half of the diameter of the roller assures that a wall or edge of such concavity may mechanically outwardly drive the roller, rather than allowing the concavity to capture the roller.

A further structural component of the instant inventive lock comprises a roller stop having a forward end. Preferably, the roller stop and the locked member are movably mounted with respect to each other so that the at least first concavity may move across and in close proximity with the forward end of the roller stop. Such positional arrangement of the at least first concavity and the roller stop assures that a roller which is nestingly received within the at least first concavity will, upon movement of said concavity across the forward end of the roller stop, contact the roller stop. Preferably, the roller stop is mounted in such close proximity with the locked member that, upon such contact of the roller with the roller stop, a side wall or edge of the concavity tends to drive the roller outwardly from the concavity and thence rearwardly from the forward end of the roller stop.

Where the locked member comprises a wheel, the necessary roller stop structure may be advantageously fabricated by drilling or cutting an aperture through a side wall of a housing within which the wheel is rotatably mounted. Where the roller comprises a spherical ball bearing, such aperture preferably has a circular cross section, and where the roller comprises a cylindrical roller bearing, such aperture preferably has a square or rectangular cross section. A side wall of such circular or rectangular channel advantageously functions as the necessary roller stop. Where the locked member comprises a stator, bar, plate, or chain, the roller stop may similarly be configured as a channel extending through a side wall of a housing adapted for receiving and accommodating lateral sliding motion of such locked member. While the roller stop preferably comprises a side wall of such drilled or cut channel as described above, numerous other roller stopping means, including ball stopping pins, ridges, and flanges, may be suitably utilized.

A plunger mounted for reciprocating forward and rearward movement with respect to the locked member is necessarily provided. While the plunger occupies its forward position, a forward end of the plunger drives the roller to a forwardly extended position wherein the roller is nestingly received within one of the concavities of the locked member, and wherein a side wall of the roller overlies the forward end of the roller stop. With the locked member, the concavity, the roller, the roller stop, and the plunger so positioned, load forces applied to the locked member tend to simultaneously drive the roller outwardly from the concavity, and into and against the roller stop and the forward end of the plunger. Resistance to rearward motion of the plunger at that instant tends to bind the roller in place between triangularly arranged contact points upon the wall or edge of the concavity, the roller stop, and the forward end of the plunger. Such binding effect causes the roller to resist movement of the concavity past the roller stop. Such resistance to movement of the concavity effectively locks the locked member in place with respect to the roller stop.

Upon release of the plunger for rearward motion and upon application of a loading force to the locked member, the locked member's concavity commences movement across the forward end of the roller stop, driving the roller out of the concavity, and thence rearwardly across the roller stop toward the plunger, releasing and unlocking the locked member.

A second housing configured as a tube whose bore is closely fitted for sliding receipt of the plunger comprises a preferred structure for accommodating the necessary reciprocating movement of the plunger. Where the roller stop comprises the preferred channel extending through a wall of the first housing, as described above, a forward end of such tube containing the plunger is preferably fixedly mounted upon an outer wall of such first housing in alignment with such channel. While such second housing comprises a preferred means for facilitating reciprocating motion of the plunger, numerous other structures such as slide ridge and slide channel combinations, slide rails, slide tracks, or slide frames may be utilized.

The reciprocating forward and rearward motion of the plunger is necessarily controlled by a toggle which spans between a rearward end of the plunger and a point rearward of the plunger, which point is preferably mechanically fixed in relation to the roller stop. Preferably, the conjunction of the rearward end of the toggle and said mechanically fixed point comprises a pivot joint, and preferably the medial joint of the toggle and the toggle's forward connection to the plunger similarly comprise pivot joints. Upon flexion of the toggle, the plunger moves rearwardly, unlocking the locked mechanism, and upon extension of the toggle, the plunger moves forwardly, driving the roller forwardly, locking the lock mechanism as described above.

The toggle is necessarily capable of slight hyperextension which is resisted by an hyperextension stop, the hyperextending motion allowing load forces applied to the locked member to urge the assembly to remain in its forwardly extended and locked position. Where the plunger is reciprocatingly mounted within the preferred second hollow bored or tubular housing, as described above, a rearward end of such housing may be advantageously utilized as support for the preferred pivot mount of the rearward end of the toggle. Where such configuration is utilized, an inner surface of a side wall of such housing further advantageously serves as the hyperextension stop.

Flexion and extension means adapted for alternately and selectively flexing and extending the toggle are preferably provided. A preferred flexion and extension means comprises a lever arm extending rearwardly from a rearward end of the toggle, such lever arm utilizing the preferred rear pivot joint of the toggle as its fulcrum. Manipulation of such preferred lever arm tends to pivot and counter-pivot the rearward link of the toggle, alternately flexing and extending the toggle, and causing the plunger to alternately move forwardly and rearwardly, alternately driving the roller forwardly for locking the locked member, and pulling the plunger rearwardly, releasing the locked member. Suitably, the preferred lever arm may differently extend from the rearward link of the toggle joint, such lever arm continuing to utilize the rearward pivot of such link as its fulcrum. Numerous other flexion and extension means applicable to the toggle joint may be utilized. For example, an actuator cable operatively connected to the toggle at a point between the toggle's forward and rearward pivots may be utilized. As a further example, one of the toggle's links or legs may be fixedly attached to a pivoting pin or axle, and rotational torque may be applied to such pin or axle.

Accordingly, it is an object of the present invention to provide a locking mechanism adapted for selectively and alternately securing and releasing locked members including wheels, stators, bars, plates, and chains.

It is a further object of the present invention to provide such a mechanism further incorporating a roller configured as a cylinder or as a sphere, as a locking member.

It is a further object of the present invention to provide such a mechanism which is capable of utilizing load forces applied to the locked member for driving the locking member to an unlocked position, and, alternately for securing the locking member in its locked position.

Other and further objects, benefits, and advantages of the present invention will become known to those skilled in the art upon review of the Detailed Description which follows, and upon review of the appended drawings.

DETAILED DESCRIPTION OF THE PREFERRED EMBODIMENT

Figure 2:
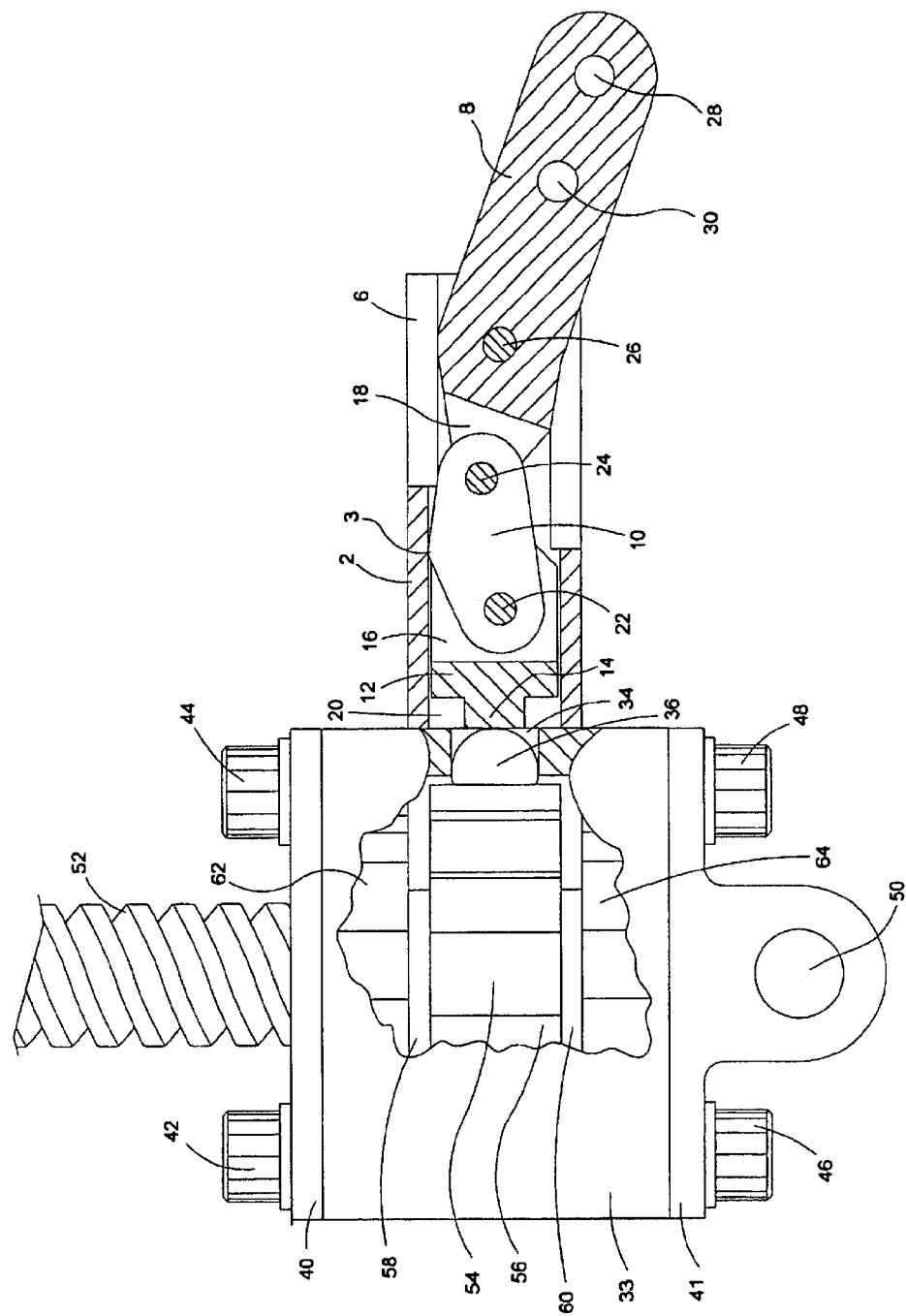
FIG. 2 is a sectional view as indicated in FIG. 1.
Figure 4:
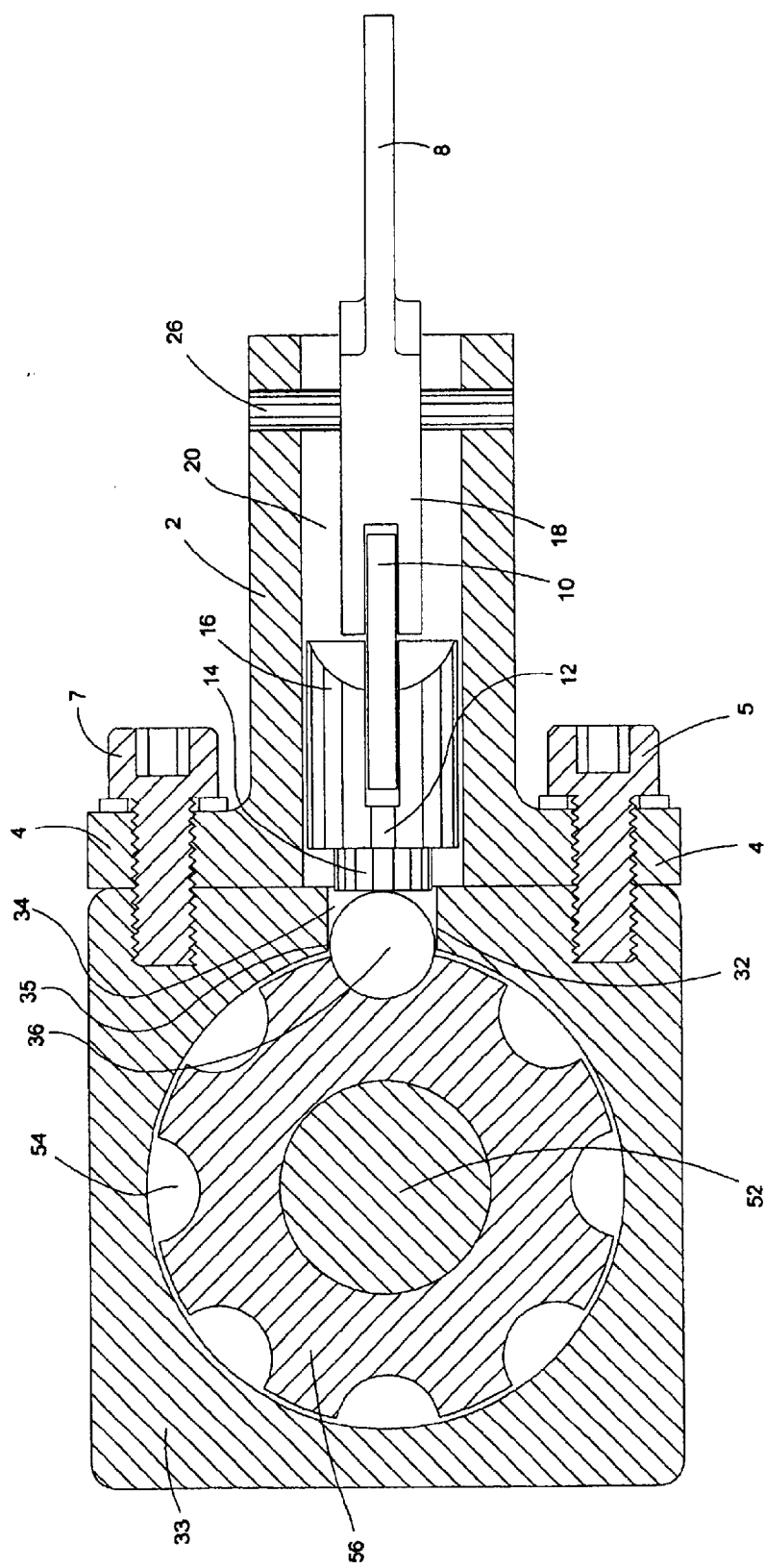
FIG. 4 is an alternate sectional view as indicated in FIG. 1.

Referring simultaneously to FIGS. 2 and 4, a wheel 56 is rotatably mounted within first a housing 33. Journals 58 and 60 extend axially from said wheel, the journals 58 and 60 being nestingly received within ball and ring bearings 62 and 64. A helically threaded shaft 52 extends axially from journal 58 and thence axially through an aperture (not depicted in view) through retainer plate 40 of first housing 33. Ring bearing 64 and journal 60 are preferably similarly retained by plate 41, such plate preferably having a mounting eye 50. Plates 40 and 41 are preferably fixedly and removably attached to first housing 33 by allen screws 42, 44, 46, and 48. Torque applied to helically threaded shaft 52 turns the wheel 56 within first housing 33.

Referring to FIG. 4, the annular outer peripheral surface of wheel 56 has a plurality of radially arranged concavities 54, each being fitted for nesting receipt of a roller which may be suitably configured either as a ball bearing or as a cylindrical roller bearing, such roller being representationally drawn and designated by Reference Numeral 36.

"Referring simultaneously to FIGS. 2 and 4, as wheel 56 rotates right handedly (with reference to FIG. 2) or clockwise (with reference to FIG. 4), a wall or edge of the concavity 54 which nestingly receives the roller 36 presses the roller 36 against a roller stopping wall of channel 34. In FIG. 2, said roller stopping wall is obscured by roller 36. In FIG. 4, said roller stopping wall is designated by Reference Numeral 32. Lefthand or counter-clockwise rotation of wheel 56 alternately presses the roller 36 against roller stopping wall 35. Where the roller 36 is configured as a cylinder, the cross sectional configuration of channel 34 is preferably square or rectangular. Where the roller 34 is configured as a ball or sphere, the cross sectional configuration of the channel 34 is preferably circular. In order to prevent the extreme forward edge of roller stopping wall 32, or of roller stopping wall 35 as the case may be, from impinging upon the roller 36 and undesirably capturing roller 36, the depth of each concavity 54 is preferably less than one-half of the circular diameter of roller 36.

Figure 5:
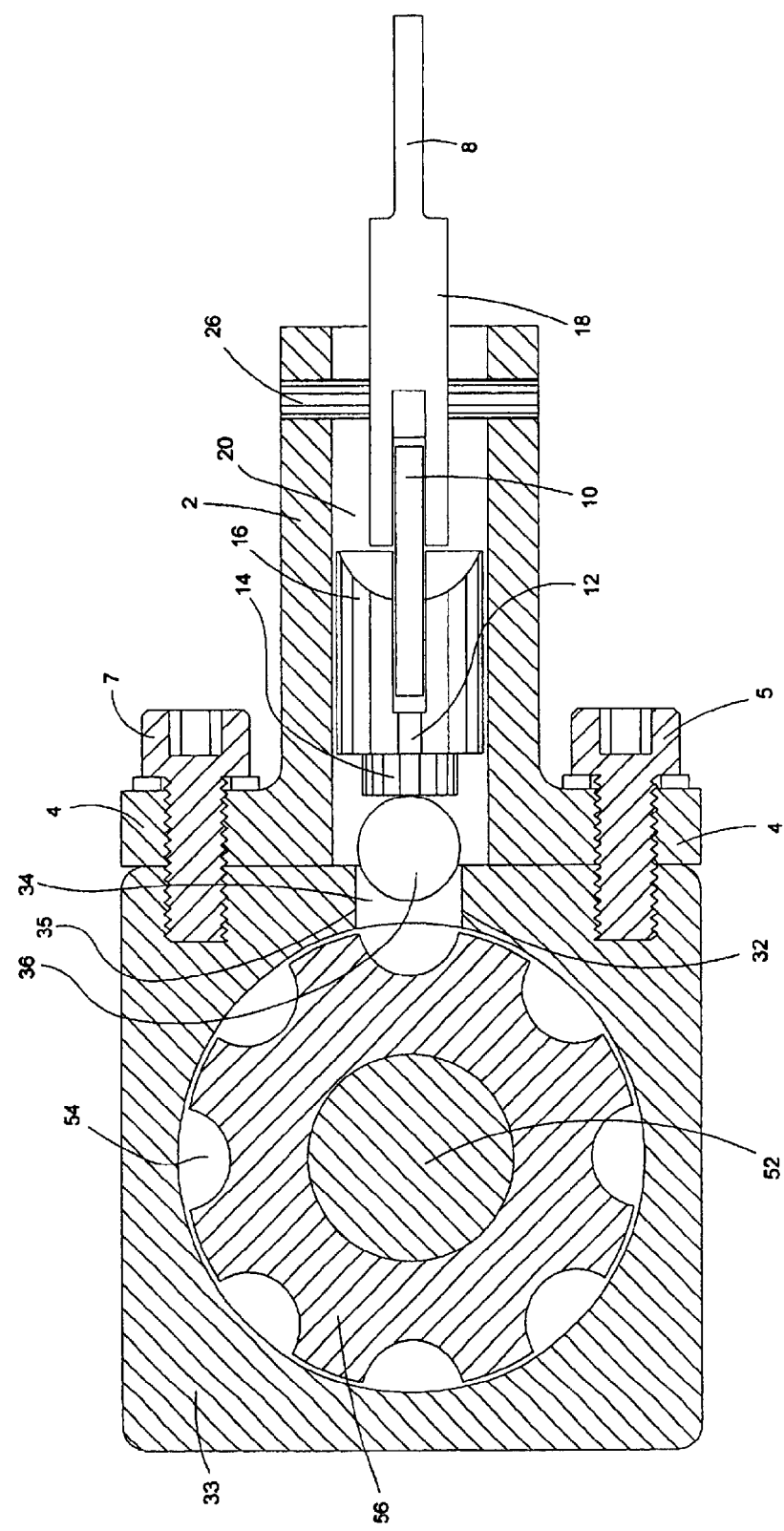
FIG. 5 redepicts FIG. 4 showing an alternate positioning of lever arm 8.
Figure 6:
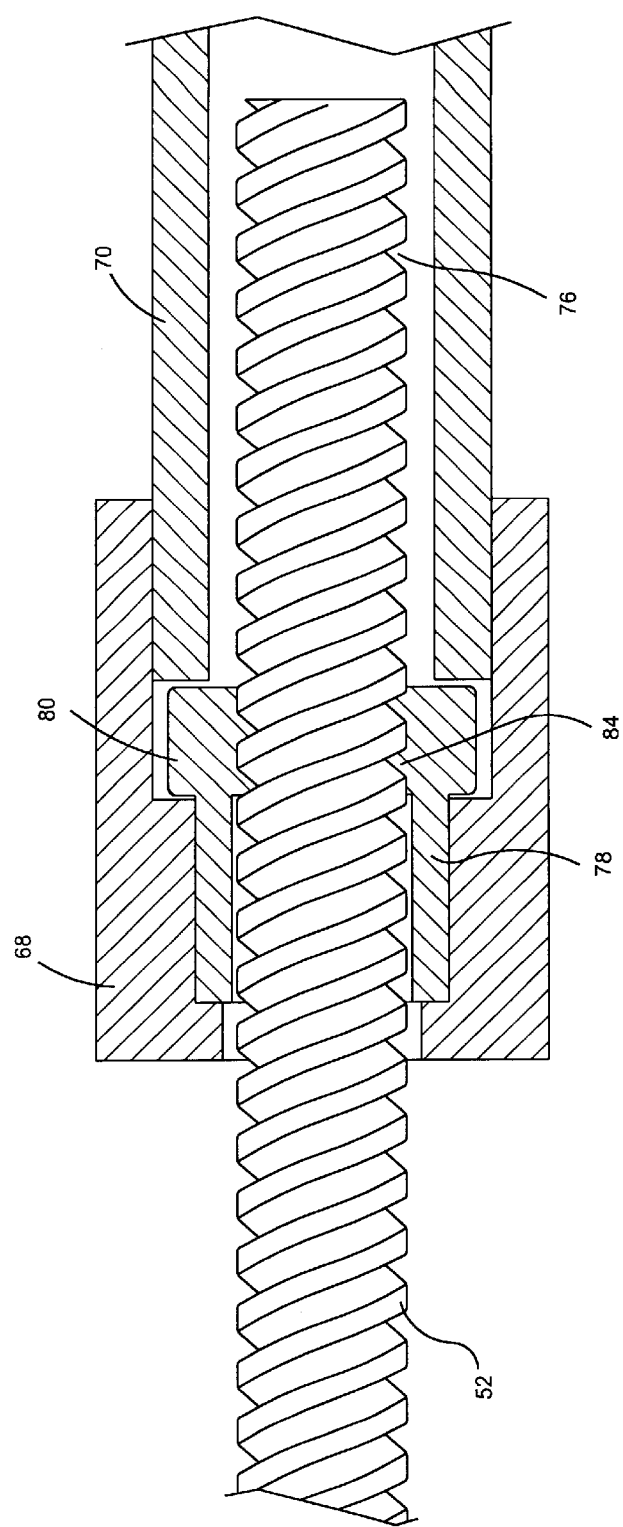
FIG. 6 is an alternate sectional view as indicated in FIG. 1.

Referring to FIG. 4, upon application of torque via shaft 52 to wheel 56, a wall or edge of the concavity 54 containing roller 36 impinges upon such roller, tending to drive such roller against one of the roller stopping walls 32 or 35 of channel 34. Referring simultaneously to FIGS. 4 and 5, in absence of the blocking presence of the head 14 of plunger 12, such driving force causes said roller 36 to slide rearwardly out of concavity 54. Such movement frees wheel 56 for rotation. Alternately, where the head 14 of plunger 12 is fixedly positioned as depicted in FIG. 4, roller 36 is prevented from sliding rearwardly through channel 34, and is prevented from withdrawing rearwardly from concavity 54, locking wheel 56 against rotation.

Figure 1:
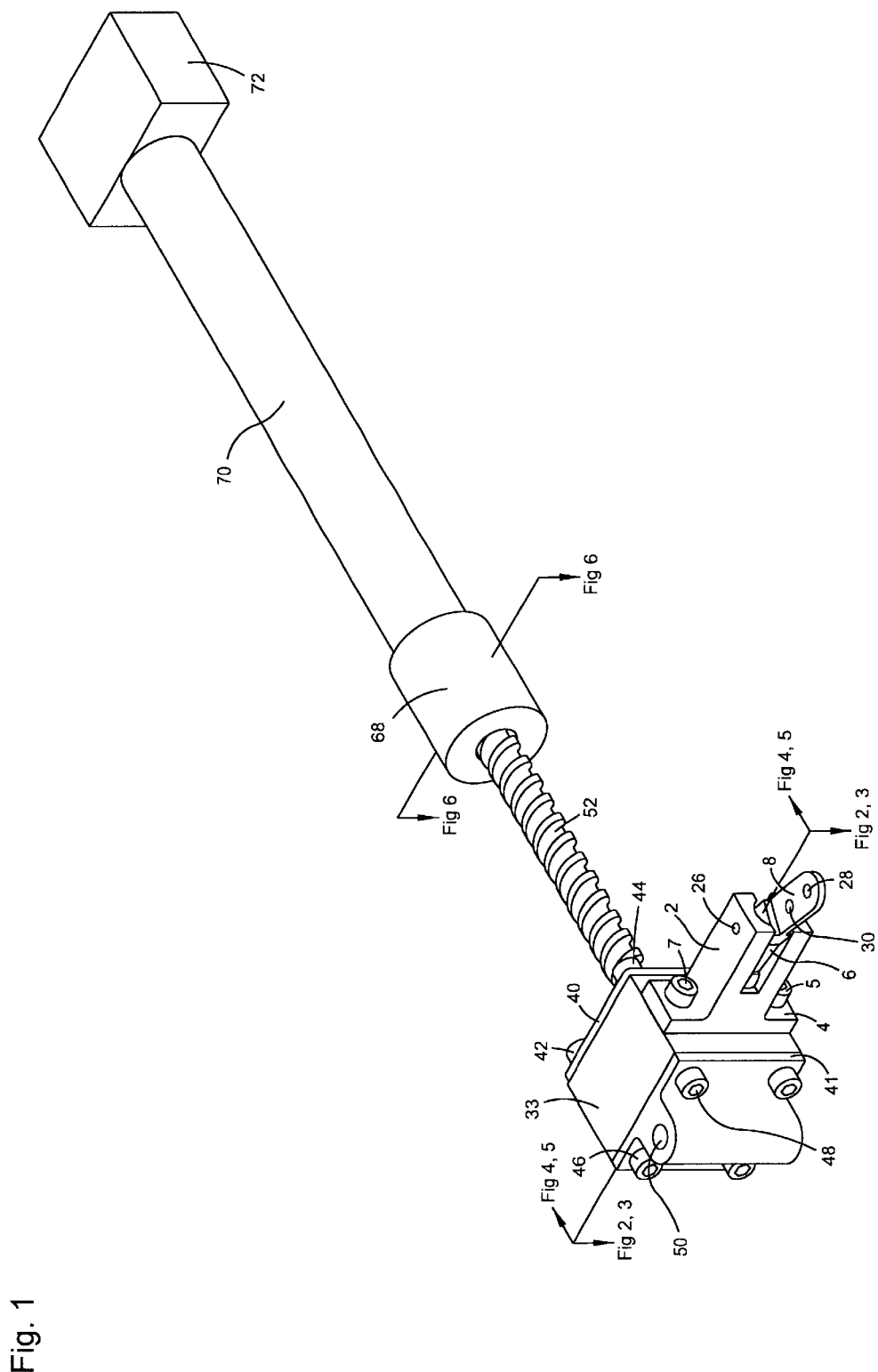
FIG. 1 depicts the inventive lock wherein the locked member comprises a wheel (not in view) rotatably mounted within a housing 33.

Referring simultaneously to FIGS. 1, 2, and 4, a second housing 2 preferably configured as a block having a hollow bore 20 is fixedly mounted upon housing 33. The housing 2 preferably has a base comprising mounting flanges 4, such base being fixedly and removably attached to housing 33 by allen screws 5 and 7. The plunger 12 is preferably closely fitted for alternate forward and rearward sliding motion within the hollow bore 20 of housing 2. A toggle linkage preferably comprising a forward clevis 16 which is formed integrally with the rearward end of the plunger 12, a first pivot pin 22, a forward toggle link 10, a medial pivot pin 24, a rear clevis 18 which is formed integrally with and comprises a rearward toggle link, a third pivot pin 26, and a lever arm 8 provides a desirable mechanical linkage between the plunger 12 and the housing 2. Preferably, the housing 2 has a longitudinal slot 6 facilitating a range of motion of lever arm 8 and facilitating, referring to FIG. 3, outward buckling of the toggle joint.

Figure 3:
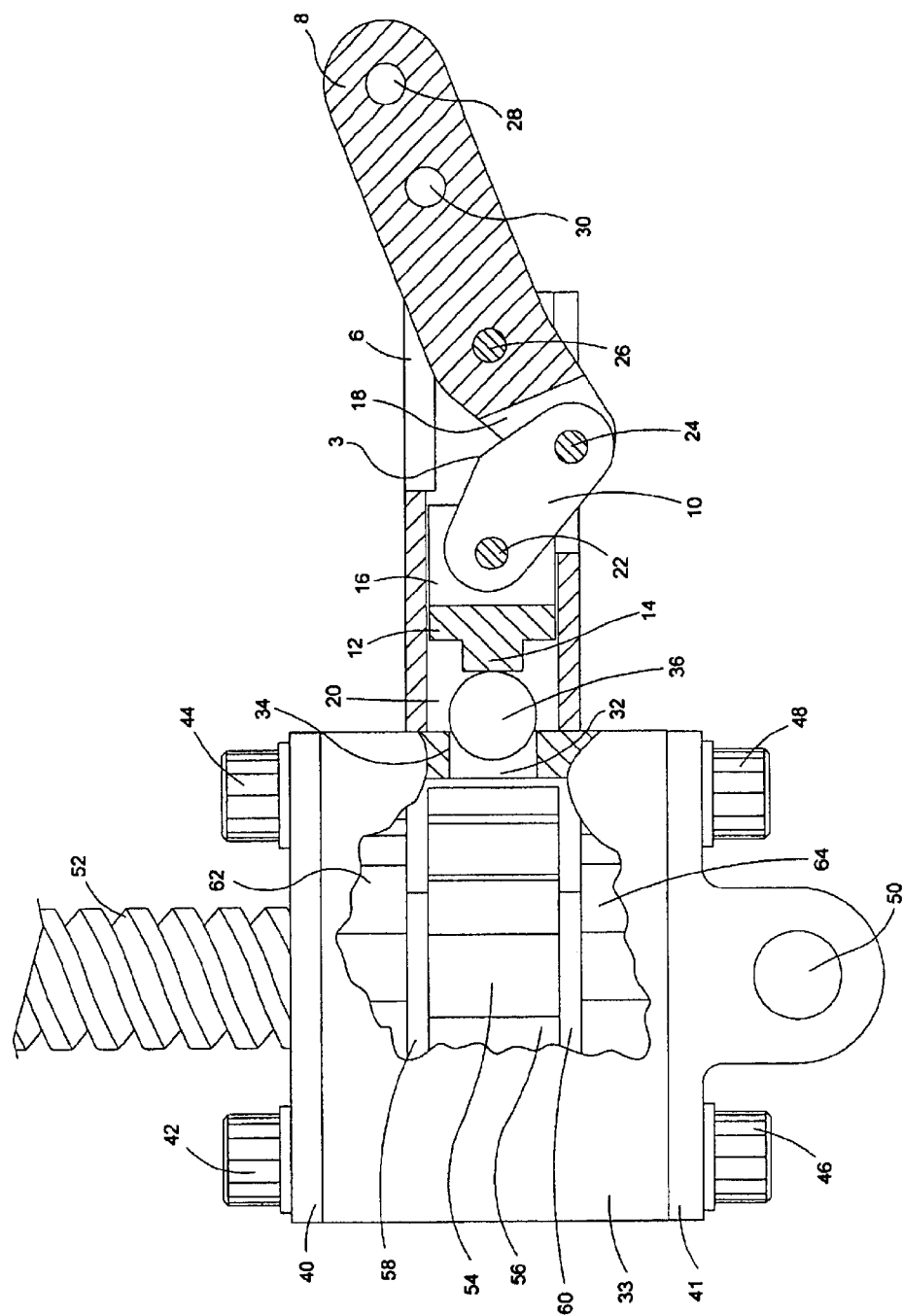
FIG. 3 redepicts FIG. 2, the mechanism of FIG. 3 showing an alternate positioning of lever arm 8.

Referring simultaneously to FIGS. 2 and 3, the toggle mechanism is adapted for movement from the flexed position depicted in FIG. 3, wherein roller 36 is allowed to be driven rearwardly, to the hyperextended position depicted in FIG. 2. While the toggle occupies such hyperextended position, a rearwardly directed load force applied to roller 36 by wheel 56 tends to buckle the toggle upwardly (with reference to the orientation of the figure). Preferably, the forward toggle link 10 includes a laterally protruding contact point 3 for stopping contact with the inner surface of the wall of housing 2. Upon such stopping contact, said wall desirably serves an hyperextension stop, preventing hyperextension beyond that depicted in FIG. 2. As a result of the toggle's ability to slightly hyperextend as depicted in FIG. 2, increases in load forces applied to the roller 36 tend to increase the hyperextending buckling pressure, assuring that increases in load forces tend to lock rather than unlock the mechanism.

Referring to FIG. 2, the locking mechanism may be released by pivoting lever arm 8 counter-clockwise. Upon such pivoting motion, torque supplied by lever arm 8 overcomes any hyperextending buckling force applied by roller 36 to the toggle, rotating the toggle to the position depicted in FIG. 3, and allowing the roller 36 to be driven rearwardly, unlocking the mechanism. A reversal of the steps described above locks the mechanism.

Referring simultaneously to FIGS. 1, 2, 3, and 6, an advantageous application of the inventive lock is depicted. Helically threaded shaft 52 freely turns within a matingly helically threaded nut 80, such nut 80 having a prismatic or threadedly mounted forward end captured by a fixedly mounted cap 68, such nut's rearward end being captured by the forward end of cylindrical sleeve 70. Helically threaded shaft 52 freely spins within and longitudinally moves within the interior bore 76 of cylindrical sleeve 70. Alternate longitudinal pulling and pushing forces applied between housing 33 and mounting block 72 tend to spin helical threaded shaft 52 and wheel 56. Utilization of the inventive locking mechanism for selectively locking and releasing the wheel 56 effectively selectively locks and releases such longitudinal pushing and pulling forces.

Figure 7:
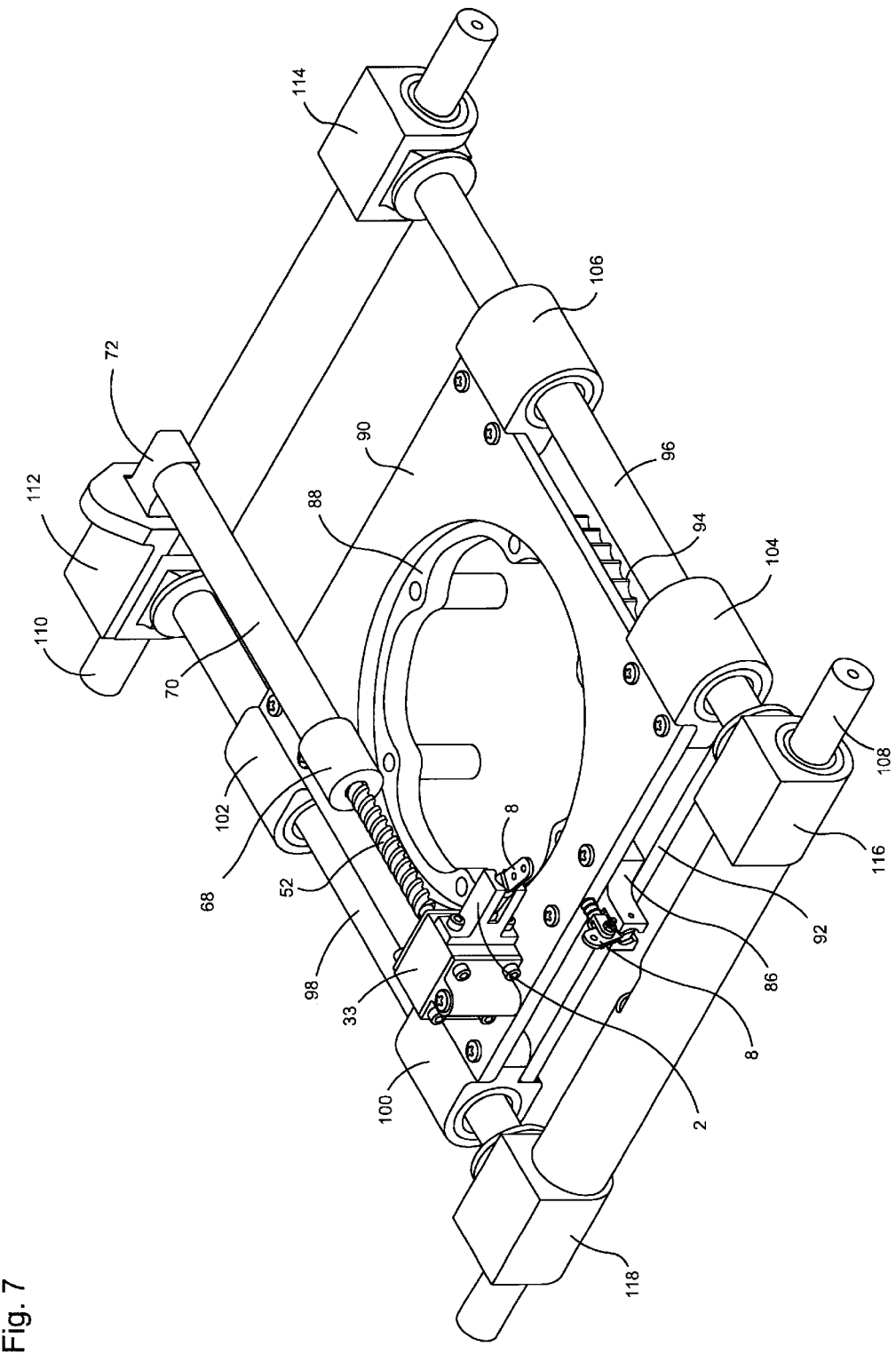
FIG. 7 is an isometric view of an exemplary swiveling seat carriage, the view depicting utilization of the mechanism of FIG. 1, and further depicting an alternate configuration of the inventive lock wherein the locked member comprises an annular stator 88.

Referring simultaneously to FIGS. 1 and 7, the apparatus of FIG. 1 is shown, for example, in use upon a rotatable and horizontally movable seat support assembly. Housing 33 is fixedly mounted upon plate 90, and mounting block 72 is fixedly mounted upon slide bar mount 112. An aircraft seat frame (not depicted) may be mounted upon ends of slide bars 108 and 110, allowing such frame to reciprocatingly slidably move in the direction of the longitudinal axes of slide bars 108 and 110. A second lock assembly similar to that depicted in FIG. 1 may span between, for example, slide bar mount 118 and such aircraft seat frame for selectively controlling such longitudinal motion. Slide bars 96 and 98 are captured by and longitudinally slidably move through ball bushings 100, 102, 104, and 106, the slide bars 96 and 98 spanning between and being fixedly attached to ball bushings 112, 114, 116, and 118. Such mechanical assembly allows the locking assembly depicted in FIG. 1 to control lateral horizontal sliding motion of such seat frame.

Referring further to the assembly of FIG. 7, the multiplicity of concavities 94 within stator 88 function substantially identically with the plurality of concavities 54 of wheel 56 depicted in FIG. 4. The concavities 94 extend inwardly into the annular outer peripheral surface of post mounted stator 88, such stator being sandwiched above and below by rotor plates 90 and 92. Housing element 86 of the lock mechanism depicted in FIG. 7 functions substantially identically with housing elements 2 and 33 depicted in FIG. 1, for selectively controlling rotating motion of rotor plates 90 and 92 with respect to stator 88. FIG. 7 demonstrates utilization of inventive locking mechanism for controlling rotary motion and planar sliding motion of a seat frame.

Figure 8:
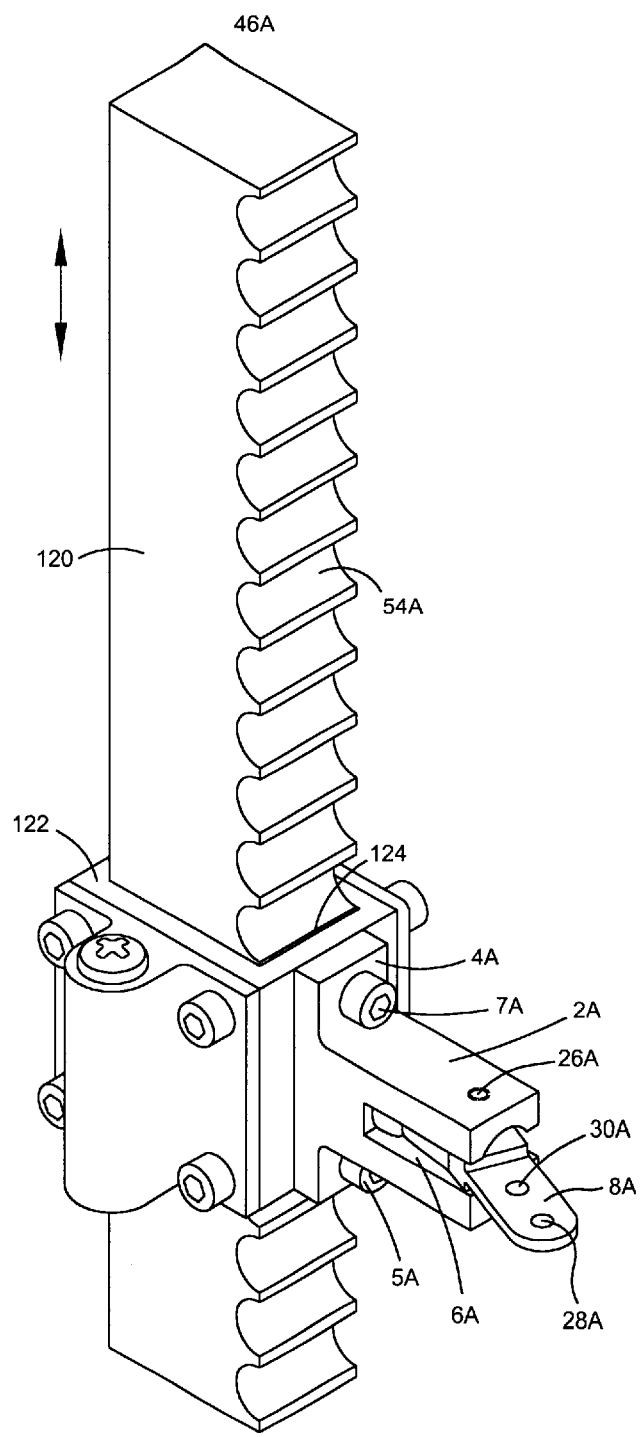
FIG. 8 depicts a second alternate configuration of the inventive lock wherein the locked member comprises a reciprocatingly movable element 120.

Referring to FIG. 8, structures identified by reference numerals having a Suffix "A" are configured substantially identically with similarly numbered elements appearing in FIGS. 1 and 4. A reciprocatingly slidable member 120 including concavities 54A extends through a channel 124, such channel extending laterally through housing 122. The alternate exemplary lock configuration depicted in FIG. 8 controls reciprocating motion of member 120 similarly with such lock's control of rotary wheel motion depicted in FIGS. 1–5, and similarly with such lock's control of rotary motion of rotors 90 and 92 with respect to a stator 88 depicted in FIG. 7. The sliding member 120 depicted in FIG. 8 is representative of various lockable members such as straight bars, curved bars, plates, and chains, any of which may be configured to include concavities 54A, and whose motion with respect to the inventive lock mechanism may be controlled by a housing such as the exemplary housings 33, 86, and 122 depicted respectively in FIGS. 1, 7, and 8.

While the principles of the invention have been made clear in the above illustrative embodiment, those skilled in the art may make modifications in the structure, arrangement, portions and components of the invention without departing from those principles. Accordingly, it is intended that the description and drawings be interpreted as illustrative and not in the limiting sense, and that the invention be given a scope commensurate with the appended claims.

I claim:

1. A lock comprising:
   (a) a roller stop having a forward end;
   (b) a locked member having at least a first roller receiving concavity, the locked member being mounted for movement of the at least first roller receiving concavity across the forward end of the roller stop;
   (c) a roller mounted for movement between forward and rearward positions, the roller, while at its forward position, extending into the at least first roller receiving concavity and overlying the forward end of the roller stop;
   (d) a plunger having a forward end and a rearward end, the plunger being mounted for motion between forward and rearward positions, the plunger, while at its forward position, holding the roller at its forward position, the plunger, while at its rearward position, allowing the roller to move to its rearward position; and
   (e) a toggle joint having a forward end, and a rearward end, the toggle joint being mounted for alternate flexion and hyperextension, the toggle joint, upon hyperextension, holding the plunger at its forward position, the toggle joint, upon flexion, withdrawing the plunger to its rearward position.

2. The lock of claim 1 further comprising an hyperextension stop, the hyperextension stop being positioned for, upon hyperextension of the toggle joint, and upon application of a rearward force to the roller, holding the roller and the plunger at their forward positions.

3. The lock of claim 2 wherein the roller comprises either a spherical body or a cylindrical body.

4. The lock of claim 3 wherein the locked member is selected from the group consisting of wheels, stators, bars, plates, and chains.

5. The lock of claim 4 further comprising a first housing having a side wall, the side wall having a roller receiving channel extending therethrough the roller receiving channel having an interior wall, the roller stop comprising the interior wall.

6. The lock of claim 5 further comprising a second housing, said housing containing the plunger and the toggle joint.

7. The lock of claim 6 wherein the forward end of the toggle joint is pivotally attached to the rearward end of the plunger.

8. The lock of claim 7 wherein the rearward end of the toggle joint is pivotally attached to the second housing.

9. The lock of claim 8 wherein the second housing has an inner wall surface, the hyperextension stop comprising the inner wall surface.

10. The lock of claim 9 further comprising flexion and hyperextension means adapted for alternately and selectively flexing and hyperextending the toggle joint.

11. The lock of claim 10 wherein the flexion and hyperextension means comprises a lever fixedly attached to the toggle joint.

12. A lock comprising:
   (a) a roller stop having a forward end;
   (b) a locked member having at least a first roller receiving concavity, the locked member being mounted for movement of the at least first roller receiving concavity across the forward end of the roller stop;
   (c) a roller mounted for movement between forward and rearward positions, the roller, while at its forward position, extending into the at least first roller receiving concavity and overlying the forward end of the roller stop;
   (d) a plunger having a forward end and a rearward end, the plunger being mounted for motion between forward and rearward positions, the plunger, while at its forward position, holding the roller at its forward position, the plunger, while at its rearward position, allowing the roller to move to its rearward position;
   (e) a toggle joint having a forward end, and a rearward end, the toggle joint being mounted for alternate flexion and hyperextension, the toggle Joint, upon hyperextension, holding the plunger at its forward position, the toggle joint, upon flexion, withdrawing the plunger to its rearward position; and
   (f) an hyperextension stop, the hyperextension stop being positioned for, upon hyperextension of the toggle joint, and upon application of a rearward force to the roller, holding the roller and the plunger at their forward positions, the roller comprising either a spherical body or a cylindrical body, the locked member being selected from the group consisting of wheels, stators, bars, plates, and chains, the at least first roller receiving concavity having a depth, wherein the roller has a diameter, and wherein the depth of the at least first roller receiving concavity is less than half of said diameter.

13. The lock of claim 12 further comprising a plurality of second roller receiving concavities, each concavity among said plurality of concavities extending into the locked member.

* * * * *